(No Model.)
B. C. WICKERS.
FENCE WIRE TIGHTENER.
No. 481,880. Patented Aug. 30, 1892.
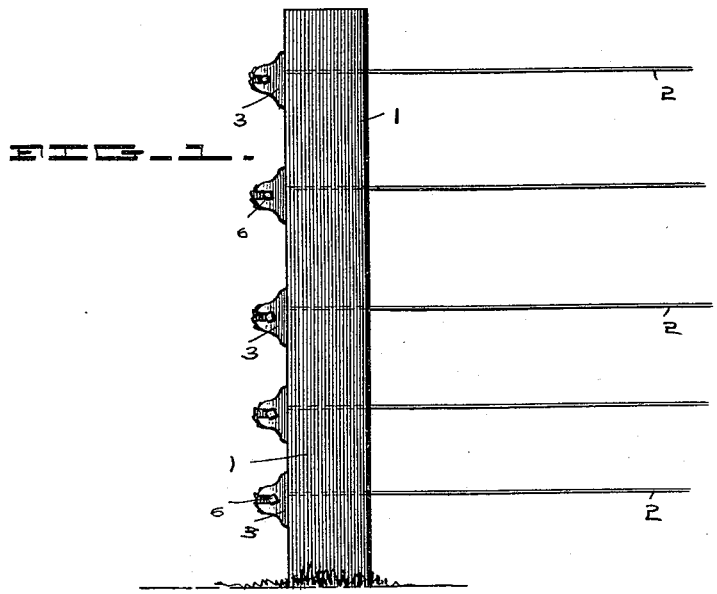
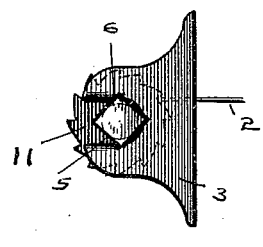
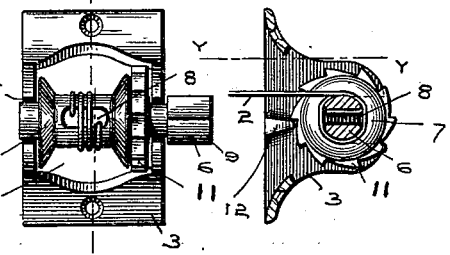
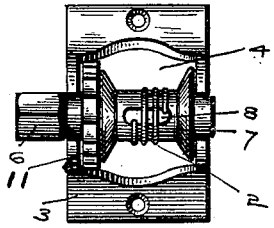
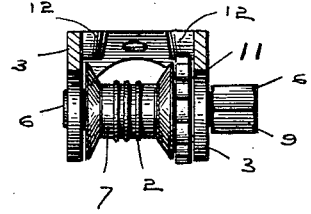
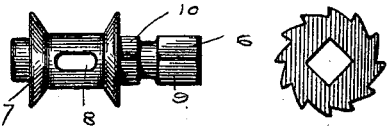
Witnesses
H. D. Nealy.
D. B. Griffith.
Inventor
Barney C. Wickers
By his Attorney
C. P. Jacobs.

UNITED STATES PATENT OFFICE.

BARNEY C. WICKERS, OF LEBANON, INDIANA, ASSIGNOR OF ONE-HALF TO ADOLPH WYSONG, OF SAME PLACE.

FENCE-WIRE TIGHTENER.

SPECIFICATION forming part of Letters Patent No. 481,880, dated August 30, 1892.

Application filed March 31, 1892. Serial No. 427,201. (No model.)

*To all whom it may concern:*

Be it known that I, BARNEY C. WICKERS, of Lebanon, county of Boone, and State of Indiana, have invented certain new and useful Improvements in Fence-Wire Tighteners; and I do hereby declare that the following is a full, clear, and exact description thereof, reference being had to the accompanying drawings, in which like figures refer to like parts.

My invention relates to a new and useful improvement in fence-wire tighteners, and to one that is more especially designed for use on wooden posts, but may, by changing the form of the bracket, be likewise used on metal or tubular posts, and it will be understood from the following description.

In the drawings, Figure 1 represents a side elevation of a post with several of my tighteners attached. Fig. 2 is an enlarged detached view of a single tightener. Fig. 3 is a front view of the same. Fig. 4 is a sectional view on the line $x\,x$, Fig. 3. Fig. 5 is a front view showing the turning-key, with its spool and ratchet reversed in the bracket, to be used on the left-hand side. Fig. 6 is a cross-sectional view on the line $y\,y$, Fig. 4. Fig. 7 is a detail view of the turning-key and its spool removed from the bracket. Fig. 8 is a detached view of the ratchet-wheel 11.

In detail, 1 represents a fence-post, and it is provided with holes or openings through the same to permit the passage of the fence-wires 2.

3 is a double bracket having a central opening 4, and on each side of its face a projection having therein a notch or recess 5, these forming bearings for the turning-key 6, on which is formed a spool or bobbin 7, having an opening 8 therein for the reception of the end of the wire, which is tied or otherwise secured to the same. The end of the turning-key 6 is squared at 9, adapting it to be operated upon by an ordinary wrench. It is also squared next to the bobbin, as at 10, and 11 is a ratchet-wheel adapted to fit on this inner squared portion, and when the turning-key is placed in the recesses 5, its bearings working therein, the ratchet 11 will come in contact with one of the lugs or projections 12 formed within the bracket. Two of these lugs are provided, as shown in Fig. 6, so that the turning-key, with its spool and ratchet, may be operated within the bracket, either as a right-hand key, as shown in Fig. 3, or as a left-hand one, as shown in Fig. 5.

When in operation, the key is first put in the bracket, the end of the wire which is to be stretched is secured through the opening 8 in the bobbin, and by operating on the outer end of the squared portion of the key with a wrench the key, with its bobbin and ratchet-wheel, is rotated, the teeth of the ratchet-wheel engaging with the lug 12 as it turns, and when the desired tension of the wire has been obtained, the lug being engaged with one of the ratchet-teeth holds the same and prevents the wire from becoming slack, and at the same time the turning-key and its parts are retained within the bracket by the tension of such wire. The advantage of this will be understood, for if it is desired for any reason to change the key from left to right hand, or to rebuild the fence, all that is necessary to be done is to pry out the key with its ratchet-wheel, so that the latter will be forced out of engagement with its lug, and the tension of the wire will unwind it. Then after reversing the ratchet on the key and the key itself and securing the end of the wire again it may be wound upon the bobbin and tightened, as before. The device being merely secured to a post by screws, is readily put up in place, and its simplicity and cheapness make it a desirable tightener.

Having fully described my invention, what I claim, and desire to secure by Letters Patent, is the following:

1. In a fence-wire tightener, a double bracket providing bearings for a turning-key, a key adapted to rotate in such bearings and provided with a removable ratchet-wheel and a spool, and a lug adapted to engage with the ratchet, formed on each side of the bracket, substantially as shown and described.

2. In a wire-fence tightener, a double bracket having bearings formed therein, lugs formed on the inside of such bracket, one on either side, a turning-key having a squared head and a bobbin formed thereon, such key adapted to fit loosely and be turned in such bearings, and a removable ratchet-wheel adapted to be keyed on such turning-key within the bracket in line with either of the lugs formed on the same, whereby such turning-key is adapted to fit in the brackets from either side, and the ratchet to engage with either lug, substantially as shown and described.

3. The combination of a bracket providing bearings for a turning-key, a key adapted to rotate in such bearings and carrying a removable ratchet-wheel and a spool, a fence-wire adapted to be secured to and tightened by such spool, and a lug adapted to engage with the ratchet, formed on each side of the bracket, the turning-key being retained within its bearings and the ratchet in engagement with the lug by the tension of the fence-wire, substantially as shown and described.

In witness whereof I have hereunto set my hand this 24th day of March, 1892.

BARNEY C. WICKERS.

Witnesses:
HUGH D. NEALY,
C. B. GRIFFITH.